(12) United States Patent
Philip, Jr. et al.

(10) Patent No.: US 9,343,195 B2
(45) Date of Patent: May 17, 2016

(54) STABILIZATION AGENTS FOR SILVER NANOWIRE BASED TRANSPARENT CONDUCTIVE FILMS

(71) Applicant: Carestream Health, Inc., Rochester, NY (US)

(72) Inventors: James B. Philip, Jr., Fort Myers, FL (US); Chaofeng Zou, Maplewood, MN (US)

(73) Assignee: Carestream Health, Inc., Rochester, NY (US)

( * ) Notice: Subject to any disclaimer, the term of this patent is extended or adjusted under 35 U.S.C. 154(b) by 367 days.

(21) Appl. No.: 14/173,885

(22) Filed: Feb. 6, 2014

(65) Prior Publication Data

US 2014/0255708 A1     Sep. 11, 2014

Related U.S. Application Data

(60) Provisional application No. 61/773,859, filed on Mar. 7, 2013.

(51) Int. Cl.
| | |
|---|---|
| H01B 1/22 | (2006.01) |
| H01B 1/24 | (2006.01) |
| H01B 13/22 | (2006.01) |
| C08K 5/3432 | (2006.01) |
| C08K 3/08 | (2006.01) |
| C09D 5/08 | (2006.01) |

(52) U.S. Cl.
CPC ............ *H01B 1/22* (2013.01); *C09D 5/086* (2013.01); *H01B 1/24* (2013.01); *H01B 13/22* (2013.01); *C08K 3/08* (2013.01); *C08K 5/3432* (2013.01); *C08K 2201/001* (2013.01); *Y10T 428/31678* (2015.04)

(58) Field of Classification Search
None
See application file for complete search history.

(56) References Cited

U.S. PATENT DOCUMENTS

| | | | |
|---|---|---|---|
| 8,049,333 B2 | 11/2011 | Alden et al. | |
| 8,052,773 B2 | 11/2011 | Takada | |
| 8,957,315 B2 * | 2/2015 | Philip, Jr. | H01B 1/22 174/251 |
| 8,957,318 B2 * | 2/2015 | Zou | H05K 1/03 174/255 |
| 2006/0257638 A1 | 11/2006 | Glatkowski et al. | |
| 2008/0286447 A1 | 11/2008 | Alden et al. | |
| 2008/0292979 A1 | 11/2008 | Ding et al. | |
| 2010/0307792 A1 | 12/2010 | Allemand et al. | |
| 2011/0024159 A1 | 2/2011 | Allemand et al. | |
| 2012/0063948 A1 | 3/2012 | Ramsden et al. | |
| 2012/0107598 A1 * | 5/2012 | Zou | C09D 7/1291 428/292.1 |
| 2012/0107600 A1 * | 5/2012 | Zou | C08J 7/045 428/301.1 |
| 2012/0126181 A1 | 5/2012 | Whitcomb et al. | |
| 2012/0148436 A1 | 6/2012 | Whitcomb et al. | |
| 2012/0207644 A1 | 8/2012 | Ollmann et al. | |
| 2012/0328469 A1 | 12/2012 | Zhang et al. | |
| 2013/0004765 A1 * | 1/2013 | Zou | C09D 5/084 428/341 |

FOREIGN PATENT DOCUMENTS

| | | |
|---|---|---|
| EP | 2 251 389 | 8/2012 |
| WO | 2011/008226 | 1/2011 |
| WO | 2011/008227 | 1/2011 |
| WO | 2011/115603 | 9/2011 |

OTHER PUBLICATIONS

C. Ducamp-Sanguesa et al., "Synthesis and Characterization of Fine and Monodisperse Silver Particles of Uniform Shape," Journal of Solid State Chemistry, 100, pp. 272-280, 1992.

Yugang Sun et al., "Uniform Silver Nanowires Synthesis by Reducing AgNO3 with Ethylene Glycol in the Presence of Seeds and Poly(Vinyl Pyrrolidone)," Chem. Mater., 2002, 14, pp. 4736-4745.

Yugang Sun et al., "Polyol Synthesis of Uniform Silver Nanowires: A Plausible Growth Mechanism and the Supporting Evidence," 2003 American Chemical Society, Nanoletters, 3(7), pp. 955-960.

* cited by examiner

*Primary Examiner* — Sheeba Ahmed

(74) *Attorney, Agent, or Firm* — Reed L. Christensen; Elizabeth Q. Shipsides

(57) ABSTRACT

Certain pyridine-ketone compounds have been found to provide anticorrosion properties when incorporated into silver nanowire containing films. Such compounds may be incorporated into one or more silver nanowire containing layers or in one or more layers disposed adjacent to the silver nanowire containing layers.

17 Claims, No Drawings

STABILIZATION AGENTS FOR SILVER NANOWIRE BASED TRANSPARENT CONDUCTIVE FILMS

CROSS-REFERENCE TO RELATED APPLICATIONS

This application claims the benefit of U.S. Provisional Patent Application No. 61/773,859, filed Mar. 7, 2013, which is hereby incorporated by reference in its entirety.

BACKGROUND

Transparent conductive films (TCF) have been used extensively in recent years in applications such as touch panel displays, liquid crystal displays, electroluminescent lighting, organic light-emitting diode devices, and photovoltaic solar cells. Indium tin oxide (ITO) based transparent conductive film has been the transparent conductor-of-choice for most applications due to its high conductivity, transparency, and relatively good stability. However, indium tin oxide based transparent conductive films have limitations due to the high cost of indium, the need for complicated and expensive vacuum deposition equipment and processes, and indium tin oxide's inherent brittleness and tendency to crack, especially when it is deposited on flexible substrates.

Two of the most important parameters for measuring the properties of transparent conductive films are total light transmittance (% T) and film surface electric conductivity. Higher light transmittance allows clear picture quality for display applications, higher efficiency for lighting and solar energy conversion applications. Lower resistivity (R) is most desirable for most transparent conductive films applications in which power consumption can be minimized. Therefore, the higher the T/R ratio of the transparent conductive films is, the better the transparent conductive films are.

U.S. Patent Application Publication 2006/0257638A1 discloses a transparent conductive film comprising carbon nanotubes (CNT) and vinyl chloride resin polymer binder.

U.S. Pat. No. 8,049,333 and U.S. Patent Application Publication 2008/0286447A1 disclose a transparent conductive film in which silver nanowires are deposited onto a substrate to form a bare nanowire network followed by overcoating the silver nanowire network with a polymer matrix material to form a transparent conductive film. Polymers such as polyacrylates and carboxyl alkyl cellulose ether polymers were suggested as useful materials for the matrix.

US Patent Application Publication 2008/0286447A1 discloses the use of aromatic triazoles and other nitrogen containing compounds as corrosion inhibitors for silver nanowire based transparent conductors. Long chain alkylthio compounds have also been disclosed as useful corrosion inhibitors.

U.S. Patent Application Publication 2008/0292979A1 discloses a transparent conductive film comprising silver nanowires, or a mixture of silver nanowires and carbon nanotubes. The transparent conductive network is formed either without polymer binder or in a photoimageable composition. The transparent conductive films were coated on both glass and polyethylene terephthalate (PET) supports.

U.S. Pat. No. 8,052,773 describes a transparent conductive film which is formed from coating of silver nanowires to form a network followed by overcoating with a layer of urethane acrylate polymer.

U.S. Patent Application Publication 2011/0024159A1 discloses use of corrosion inhibitors in an overcoat layer of a transparent conductive film.

PCT Patent Publication WO 2011/115603 discloses anti-corrosion agents comprising 1,2-diazine compounds for use in transparent conductive films.

US Patent Application Publication 2010/0307792A1 discloses addition of coordination ligands with silver nanowire aqueous dispersions to form sediments followed by separation of such sediments from the supernatant containing halide ions before applying such silver nanowire dispersions in the coating and formation of TCF.

European Patent EP2251389B1 discloses a silver nanowire based ink formulation in which various aqueous silver complex ions were added into silver nanowire based ink in a ratio of complex ion to silver nanowire of no more than 1:64 (w:w).

SUMMARY

Certain pyridine-ketone compounds are particularly useful as anticorrosion agents for the stabilization of a network of silver nanowire-based transparent conductive films toward the undesirable reaction of such conductive films with corrosive agents such as hydrogen sulfide.

We have discovered that the effectiveness of such pyridine-ketone compounds may be enhanced by their introduction in at least one coating mix for at least one layer disposed adjacent to the at least one layer comprising silver nanowires. Such a layer might be an overcoat or topcoat layer, if disposed on the at least one layer comprising silver nanowires. Such an overcoat or topcoat layer may, for example, be thermally cured or UV cured. Alternatively, such a layer might be a primer or undercoat layer, if disposed between the at least one layer comprising silver nanowires and the transparent support. Or the pyridine-ketone compounds might be included in layers both above and below that at least one layer comprising silver nanowires. In any of these cases, the pyridine-ketone compounds may, optionally, also be added to at least one of the layers comprising silver nanowires.

At least a first embodiment provides a transparent conductive article comprising a transparent support; at least one first layer disposed on the transparent support, the at least one first layer comprising a network of silver nanowires dispersed within a polymer binder; and at least one second layer disposed on the at least one first layer, the at least one second layer comprising one or more pyridine-ketone compounds.

In at least some such embodiments, the at least one first layer may further comprise one or more pyridine-ketone compounds.

At least a second embodiment provides a transparent conductive article comprising a transparent support; at least one first layer disposed on the transparent support, the at least one first layer comprising one or more pyridine-ketone compounds; and at least one second layer disposed on the at least one first layer, the at least one second layer comprising a network of silver nanowires dispersed within a polymer binder.

In at least some such embodiments, the at least one second layer may further comprise one or more pyridine-ketone compounds.

At least a third embodiment provides a transparent conductive article comprising a transparent support; at least one first layer disposed on the transparent support; at least one second layer disposed on the at least one first layer, the at least one second layer comprising a network of silver nanowires dispersed within a polymer binder; at least one third layer disposed on the at least one second layer, the at least one third layer comprising one or more pyridine-ketone compounds.

In at least some such embodiments, the at least one second layer may further comprise one or more pyridine-ketone compounds.

At least a fourth embodiment provides methods comprising applying at least one first coating mixture onto a transparent support to form at least one first coated layer, the at least one first coating mixture comprising silver nanowires and at least one polymer binder; and applying at least one second coating mixture onto the at least one first coated layer to form at least one second coated layer, the at least one second coating mixture comprising one or more pyridine-ketone compounds.

In at least some such embodiments, the at least one first coating mixture may further comprise one or more pyridine-ketone compounds.

At least a fifth embodiment provides methods comprising applying at least one first coating mixture onto a transparent support to form at least one first coated layer, the at least one first coating mixture comprising at least one pyridine-ketone compound, and applying at least one second coating mixture onto the at least one first coated layer, the at least one second coating mixture comprising silver nanowires and at least one polymer binder.

In at least some such embodiments, the at least one second coating mixture may further comprise one or more pyridine-ketone compounds.

DESCRIPTION

All publications, patents, and patent documents referred to in this document are incorporated by reference in their entirety, as though individually incorporated by reference.

U.S. Provisional Patent Application No. 61/773,859, filed Mar. 7, 2013, is hereby incorporated by reference in its entirety.

Definitions:

The terms "conductive layer" or "conductive film" refer to the network layer comprising silver nanowires dispersed within a polymer binder.

The term "conductive" refers to electrical conductivity.

The term "article" refers to the coating of a "conductive layer" or "conductive film" on a support.

The terms "coating weight," "coat weight," and "coverage" are synonymous, and are usually expressed in weight or moles per unit area such as $g/m^2$ or $mol/m^2$.

The term "transparent" means capable of transmitting visible light without appreciable scattering or absorption.

"Haze" is wide-angle scattering that diffuses light uniformly in all directions. It is the percentage of transmitted light that deviates from the incident beam by more than 2.5 degrees on the average. Haze reduces contrast and results in a milky or cloudy appearance. Materials having lower haze percentages appear less hazy than those having higher haze percentages.

The term "organic solvent" means "a material, liquid at use temperature, whose chemical formula comprises one or more carbon atoms."

The term "aqueous solvent" means a material, liquid at use temperature, whose composition in a homogeneous solution comprises water in the greatest proportion (i.e., at least 50 percent water by weight).

The term "water soluble" means the solute forms a homogenous solution with water, or a solvent mixture in which water is the major component.

The terms "a" or "an" refer to "at least one" of that component (for example, the anticorrosion agents, nanowires, and polymers described herein).

Furthermore, all publications, patents, and patent documents referred to in this document are incorporated by reference herein in their entirety, as though individually incorporated by reference.

Introduction

In order for silver based transparent conductors to have practical use it is important that these silver based transparent conductors be stable for a long period when subjected to environmental conditions.

Any atmospheric corrosion due to the reaction of low levels of chemicals in the air may induce undesirable chemical reactions at the metal nanowire surface, impacting the conductivity and performance of the metal nanowire based transparent conductors. It is well known that corrosion, or "tarnishing," may readily occur on silver metal surfaces when exposed to the atmosphere. Without wishing to be bound by theory, one example of such a tarnishing mechanism is sulfidation of silver surface by reaction of hydrogen sulfide with silver:

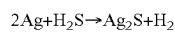

$$2Ag+H_2S \rightarrow Ag_2S+H_2$$

Because the electric conductivity of silver compounds such as silver sulfide is much lower than that of silver metal, silver nanowire based conductors can gradually lose conductivity when exposed to the atmosphere.

In contrast to bare metal wires exposed to the air, silver nanowires in a polymer matrix are more stable since the presence of the polymer slows down the diffusion of hydrogen sulfide (or other corrosive agents) to the silver nanowire surface. Nevertheless, it is important to stabilize the silver nanowire surface to prevent the sulfidation process, even when the nanowires are embedded in a polymer matrix.

It would be useful to find anticorrosion agents for transparent electrically conductive films comprising a network of silver nanowires in polymer binder(s) that can be coated from aqueous or from organic solvents, using common coating techniques.

Silver Nanowires

The silver nanowires are an essential component for imparting electrical conductivity to the conductive films, and to the articles prepared using the conductive films. The electrical conductivity of the transparent conductive film is mainly controlled by a) the conductivity of a single nanowire, b) the number of nanowires between the terminals, and c) the number of connections and the contact resistivity between the nanowires. Below a certain nanowire concentration (also referred as the percolation threshold), the conductivity between the terminals is zero, as there is no continuous current path provided because the nanowires are spaced too far apart. Above this concentration, there is at least one current path available. As more current paths are provided, the overall resistance of the layer will decrease. However, as more current paths are provided, the clarity (i.e., percent light transmission) of the conductive film decreases due to light absorption and back scattering by the nanowires. Also, as the amount of silver nanowires in the conductive film increases, the haze of the transparent film increases due to light scattering by the silver nanowires. Similar effects will occur in transparent articles prepared using the conductive films.

In one embodiment, the silver nanowires have aspect ratio (length/width) of from about 20 to about 3300. In another embodiment, the silver nanowires have an aspect ratio (length/width) of from about 500 to 1000. Silver nanowires having a length of from about 5 μm to about 100 μm (micrometer) and a width of from about 10 nm to about 200 nm are useful. Silver nanowires having a width of from about 20 nm to about 100 nm and a length of from about 10 μm to about 50 µm are also particularly useful for construction of a transparent conductive network film.

Silver nanowires can be prepared by known methods in the art. In particular, silver nanowires can be synthesized through solution-phase reduction of a silver salt (e.g., silver nitrate) in the presence of a polyol (e.g., ethylene glycol or propylene glycol) and poly(vinyl pyrrolidone). Large-scale production of silver nanowires of uniform size can be prepared according to the methods described in, e.g., Ducamp-Sanguesa, C. et al., J. of Solid State Chemistry, (1992), 100, 272-280; Sun, Y. et al., Chem. Mater. (2002), 14, 4736-4745, Sun, Y. et al., Nano Letters, (2003), 3(7), 955-960; US patent application publication 2012/0063948, published Mar. 15, 2012; US patent application publication 2012/0126181, published May 24, 2012; US patent application publication 2012/0148436, published Jun. 14, 2012; US patent application publication 2012/0207644, published Aug. 16, 2012; and US patent application publication 2012/0328469, published Dec. 27, 2012, each of which is incorporated by reference in its entirety.

Polymer Binders

For a practical manufacturing process for transparent conductive films, it is important to have both the conductive components, such as silver nanowires, and a polymer binder in a coating dispersion. The polymer binder solution serves a dual role, as dispersant to facilitate the dispersion of silver nanowires and as a viscosifier to stabilize the silver nanowire coating dispersion so that the sedimentation of silver nanowires does not occur at any point during the coating process. It is also desirable to have the silver nanowires and the polymer binder in a single coating dispersion. This simplifies the coating process and allows for a one-pass coating, and avoids the method of first coating bare silver nanowires to form a weak and fragile film that is subsequently over-coated with a polymer to form the transparent conductive film.

In order for a transparent conductive film to be useful in various device applications, it is also important for the polymer binder of the transparent conductive film to be optically transparent and flexible, yet have high mechanical strength, good hardness, high thermal stability, and light stability. This requires polymer binders to be used for transparent conductive film to have Tg (glass transition temperature) greater than the use temperature of the transparent conductive film.

Transparent, optically clear polymer binders are known in the art. Examples of suitable polymeric binders include, but are not limited to: polyacrylics such as polymethacrylates (e.g., poly(methyl methacrylate)), polyacrylates and polyacrylonitriles, polyvinyl alcohols, polyesters (e.g., polyethylene terephthalate (PET), polybutylene terephthalate, and polyethylene naphthalate), polymers with a high degree of aromaticity such as phenolics or cresol-formaldehyde (e.g., NOVOLAC®), polystyrenes, polyvinyltoluene, polyvinylxylene, polyimides, polyamides, polyamideimides, polyetheramides, polysulfides, polysulfones, polyphenylenes, and polyphenyl ethers, polyurethane (PU), polycarbonates, epoxy, polyolefins (e.g. polypropylene, polymethylpentene, and cyclic olefins), acrylonitrile-butadiene-styrene copolymer (ABS), cellulosics, silicones and other silicon-containing polymers (e.g. polysilsesquioxanes and polysilanes), polyvinylchloride (PVC), polyvinylacetates, polynorbornenes, synthetic rubbers (e.g. EPR, SBR, EPDM), and fluoropolymers (e.g., polyvinylidene fluoride, polytetrafluoroethylene (TFE) or polyhexafluoropropylene), copolymers of fluoro-olefin and hydrocarbon olefin (e.g., LUMIFLON®), and amorphous fluorocarbon polymers or copolymers (e.g., CYTOP® by Asahi Glass Co., or TEFLON® AF by Du Pont), polyvinylbutryals, polyvinylacetals, gelatins, polysaccharides, and starches.

In certain embodiments, in order to disperse and stabilize silver nanowires in polymeric coating solution, the use of polymer binders having high oxygen content is advantageous. Oxygen-containing groups, such as hydroxyl group and carboxylate groups have a strong affinity for binding to the silver nanowire surface and facilitate the dispersion and stabilization. Many oxygen-rich polymers also have good solubility in the polar organic solvents commonly used to prepare organic solvent-coated materials, while other oxygen-rich polymers have good solubility in water or the aqueous solvent mixtures commonly used to prepare aqueous solvent-coated materials.

In certain embodiments, cellulose ester polymers, such as cellulose acetate butyrate (CAB), cellulose acetate (CA), or cellulose acetate propionate (CAP) are superior to other oxygen-rich polymer binders when used to prepare silver nanowire based transparent conductive films that are coated from organic solvents such as 2-butanone (methyl ethyl ketone, MEK), methyl iso-butyl ketone, acetone, methanol, ethanol, 2-propanol, ethyl acetate, propyl acetate, butyl acetate, or mixtures thereof. Their use results in transparent conductive films in which both the optical light transmittance and electrical conductivity of the coated films are greatly improved. In addition, these cellulose ester polymers have glass transition temperatures of at least 100° C. and provide transparent, flexible films having high mechanical strength, good hardness, high thermal stability, and light stability.

The cellulose ester polymers can be present in from about 40 to about 90 wt % of the dried transparent conductive films. Preferably, they are present in from about 60 to about 85 wt % of the dried films. In some constructions, a mixture of a cellulosic ester polymer and one or more additional polymers may be used. These polymers should be compatible with the cellulosic polymer. By compatible is meant that a mixture comprising at least one cellulosic ester polymer and one or more additional polymers forms a transparent, single phase composition when dried. The additional polymer or polymers can provide further benefits such as promoting adhesion to the support and improving hardness and scratch resistance. As above, total wt % of all polymers is from about 40 to about 95 wt % of the dried transparent conductive films. Preferably, the total weight of all polymers is from about 60 to about 85 wt % of the dried films. Polyester polymers, urethanes, and polyacrylics are examples of additional polymers useful for blending with cellulosic ester polymers.

In other embodiments, water soluble polymer binders can also be used, such as polyvinyl alcohol, gelatin, polyacrylic acid, polyimides. Other water dispersible latex polymers can also be used such as polyacrylates and polymethacrylates containing methyl acrylic acid units. Coating from aqueous solutions benefits the environment and reduces the emission of volatile organic compounds during manufacturing.

The use of water soluble polymers, such as polyvinyl alcohol or gelatin as binders for silver nanowire based transparent conductors results in superior transparent conductive films in which both film transmittance and conductivity are greatly improved. Transparent conductive films prepared using either polyvinyl alcohol or gelatin polymer binders also show excellent clarity, scratch resistance, and hardness when polymer cross linkers are added to the polymer solution. Transparent conductive films prepared according to this invention provide transmittance of at least 80% across entire spectrum range of about 350 nm to about 1100 nm, and surface resistivity of 500 ohm/sq or less.

The transparent conductive articles comprising silver nanowires and water soluble polymer binders also show excellent clarity, high scratch resistance, and hardness. In addition, transparent conductive films prepared using these polymer binders have good adhesion to supports comprising polyethylene terephthalate (PET), poly(methylmethacrylate), polycarbonate, and the like, when an appropriate subbing layer is applied between the support and the conductive layer.

The water soluble polymer binders are present in from about 40 to about 95 wt % of the dried transparent conductive films. Preferably, they are present in from about 60 to about 85 wt % of the dried films.

In some constructions, up to 50 wt % of the gelatin or polyvinyl alcohol polymer binder can be replaced by one or more additional polymers. These polymers should be compatible with the gelatin or polyvinyl alcohol polymer binder. By compatible is meant that the all polymers form a transparent, single phase mixture when dried. The additional polymer or polymers can provide further benefits such as promoting adhesion to the support and improving hardness and scratch resistance. Water soluble acrylic polymers are particularly preferred as additional polymers. Examples of such polymers are polyacrylic acid and polyacrylamides, and copolymers thereof. As above, total wt % of all polymers is from about 50 to about 95 wt % of the dried transparent conductive films. Preferably, the total weight of all polymers is from about 70 to about 85 wt % of the dried films.

If desired, scratch resistance and hardness of the transparent conductive films with these polymer binders to the support can be improved by use of crosslinking agents to crosslink the polymer binders. Isocyanates, alkoxyl silanes, and melamines are examples of typical crosslinking agents for cellulose ester polymers containing free hydroxyl groups. Vinyl sulfones and aldehydes are examples of typical crosslinking agents for gelatin binders.

Stabilization Agents

Stabilization agents are chemical compounds that, when added to the transparent conductive film, improve the stability of the construction with respect to atmospheric corrosion caused by the reaction of oxygen or one or more other chemicals in the atmosphere with one or more components in the film. This reaction results in deterioration of the electric conductivity, optical properties, and/or physical integrity of the film. Stabilization agents should be colorless and odorless when used in the transparent conductive film, and should be stable to the conditions of heat, light, and humidity in the environment where transparent conductive film is used.

However, in practice, many such compounds, when bound to a silver nanowire surface, will drastically reduce the electric conductivity of the resultant conductive film. Apparently, the insulating effect of these compounds prevents electron "flow" at nanowire contact points. Therefore, it is important to identify a class of compounds that will provide anticorrosion protection to transparent conductive film without causing significant reduction in conductivity and other negative effects. Advantageously, delaying introduction of the anticorrosion agents into the conductive nanowire network until after its formation can minimize the destruction of conductive paths in the network.

Pyridine-Ketone Compounds

In some embodiments, stabilization agents comprise pyridine-ketone compounds. We have found that pyridine-ketone compounds have anti-corrosive and stabilizing effects when incorporated into silver nanowire containing films. Without wishing to be bound by theory, it is believed the ability of pyridine-ketone compounds to form strong chelating bonding sites with silver nanowire surfaces allows this class of compound to effectively prevent the sulfide compounds in the air from reacting with the silver nanowires, and thus the nanowire surface is stabilized and corrosion inhibited. Yet, this type of compound is not bulky enough to, when adsorbed on the silver nanowire surface, prevent electron flow between nanowires in the conductive network. As a result, conductivity is not greatly retarded with the stabilizer present.

In this application, the term "pyridine-ketone compound" shall mean a compound comprising a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and a first carbonyl group comprising a first carbonyl carbon atom covalently bonded to the first alpha carbon atom, to a first oxygen atom, and to a first other carbon atom.

In some embodiments, the pyridine-ketone compound may further comprise a second carbonyl group comprising a second carbonyl carbon atom covalently bonded to the second alpha carbon atom, to a second oxygen atom, and to a second other carbon atom.

In other embodiments, the pyridine-ketone compound comprises a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and a first carbonyl group comprising a second carbonyl carbon atom covalently bonded to the first alpha carbon, to a first oxygen atom, and to the third alpha carbon atom.

In some such embodiments the pyridine-ketone compound may further comprise a second carbonyl group comprising a second carbonyl carbon atom covalently bonded to the second alpha carbon atom, to a second oxygen atom, and to a first other carbon atom. Such pyridine-ketone compounds may optionally further comprise a third carbonyl group comprising a third carbonyl carbon atom covalently bonded to the fourth alpha carbon, to a third oxygen atom, and to a second other carbon atom.

Exemplary pyridine-ketone compounds are 2,6-diacetyl pyridine (DAP), having the structure:

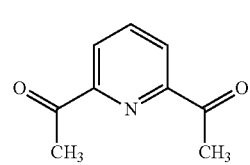

and di(2-pyridal)ketone (DPK), having the structure:

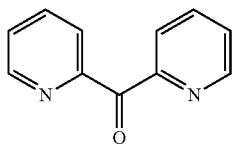 [SMILES: O=C(c1ccccn1)c1ccccn1]

Coating of the Conductive Films

An organic solvent-based coating formulation for the transparent silver nanowire films can be prepared by mixing the various components with one or more polymer binders in a suitable organic solvent system that usually includes one or more solvents such as toluene, 2-butanone (methyl ethyl ketone, MEK), methyl iso-butyl ketone, acetone, methanol, ethanol, 2-propanol, ethyl acetate, propyl acetate, butyl acetate, ethyl lactate, tetrahydrofuran, or mixtures thereof. An aqueous-based coating formulation for the transparent silver nanowire films can be prepared by mixing the various components with one or more polymer binders in water or in a mixture of water with a water miscible solvent such as acetone, acetonitrile, methanol, ethanol, 2-propanol, or tetrahydrofuran, or mixtures thereof. Transparent films containing silver nanowires can be prepared by coating the formulations using various coating procedures such as wire wound rod coating, dip coating, knife or blade coating, curtain coating, slide coating, slot-die coating, roll coating, or gravure coating. Surfactants and other coating aids can be incorporated into the coating formulation.

In one embodiment the coating weight of the silver nanowires is from about 10 mg/m² to about 500 mg/m². In another embodiment the coating weight of silver nanowires is from about 20 mg/m² to about 200 mg/m². In a further embodiment, the coating weight of silver nanowires is from about 30 mg/m² to about 120 mg/m². A useful coating dry thickness of the transparent conductive coating is from about 0.05 µm to about 2.0 µm, and preferably from about 0.1 µm to about 0.5 µm.

Upon coating and drying, the transparent conductive film should have a surface resistivity of less than 1,000 ohms/sq and preferably less than 500 ohm/sq.

Upon coating, and drying, the transparent conductive film should have as high a % transmittance as possible. A transmittance of at least 70% is useful. A transmittance of at least 80% and even at least 90% are even more useful.

Particularly useful are films with a transmittance of at least 70% and a surface resistivity of less than 500 ohm/sq.

Such transparent conductive films provide transmittance of at least 80% across entire spectrum range of from about 350 nm to about 1100 nm, and surface resistivity of less than 500 ohm/sq.

Transparent Support

In one embodiment, the conductive materials are coated onto a support. The support may be rigid or flexible.

Suitable rigid substrates include, for example, glass, polycarbonates, acrylics, and the like.

When the conductive materials are coated onto a flexible support, the support is preferably a flexible, transparent polymeric film that has any desired thickness and is composed of one or more polymeric materials. The support is required to exhibit dimensional stability during coating and drying of the conductive layer and to have suitable adhesive properties with overlying layers. Useful polymeric materials for making such supports include polyesters [such as poly(ethylene terephthalate) (PET) and poly(ethylene naphthalate) (PEN)], cellulose acetates and other cellulose esters, polyvinyl acetal, polyolefins, polycarbonates, and polystyrenes. Preferred supports are composed of polymers having good heat stability, such as polyesters and polycarbonates. Support materials may also be treated or annealed to reduce shrinkage and promote dimensional stability. Transparent multilayer supports can also be used.

Coating of the Conductive Films onto a Support

Transparent conductive articles can be prepared by coating the formulations described above onto a transparent support using various coating procedures such as wire wound rod coating, dip coating, knife coating, curtain coating, slide coating, slot-die coating, roll coating, gravure coating, or extrusion coating.

Alternatively, transparent conductive articles can be prepared by laminating the transparent conductive films prepared as described above onto a transparent support.

In some embodiments, a "carrier" layer formulation comprising a single-phase mixture of two or more polymers may be applied directly onto the support and thereby located between the support and the silver nanowire layer. The carrier layer serves to promote adhesion of the support to the transparent polymer layer containing the silver nanowires. The carrier layer formulation can be sequentially or simultaneously applied with application of the transparent conductive silver nanowire layer formulation. It is preferred that all coating be applied simultaneously onto the support. Carrier layers are often referred to as "adhesion promoting layers," "interlayers," or "intermediate layers."

As noted above, in one embodiment the coating weight of the silver nanowires is from about 20 mg/m² to about 500 mg/m². In other embodiments, coating weight of silver nanowires is from about 10 mg/m² to about 200 mg/m². Embodiments wherein the silver nanowires are coated at from about 10 mg/m² to about 120 mg/m² are also contemplated.

Upon coating and drying, the transparent conductive article should have a surface resistivity of less than 1,000 ohms/sq and preferably less than 500 ohm/sq.

Similarly, upon coating and drying on a transparent support, the transparent conductive article should have as high an optical transmittance as possible. A transmittance of at least 70% is useful. A transmittance of at least 80% and even at least 90% are even more useful.

Particularly preferred are articles with a transmittance of at least 80% and a surface resistivity of less than 500 ohm/sq.

EXEMPLARY EMBODIMENTS

U.S. Provisional Patent Application No. 61/773,859, filed Mar. 7, 2013, which is hereby incorporated by reference in its entirety, disclosed the following 62 non-limiting exemplary embodiments:

A. A transparent conductive article comprising:
  a transparent support;
  at least one first layer disposed on the transparent support, the at least one first layer comprising a network of silver nanowires dispersed within at least one polymer binder; and;
  at least one second layer disposed on the at least one first layer, the at least one second layer comprising at least one pyridine-ketone compound.

B. The transparent conductive article according to embodiment A, wherein the at least one pyridine-ketone compound comprises:
  a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and a first carbonyl group comprising a first carbonyl carbon atom covalently bonded to the first alpha carbon atom, to a first oxygen atom, and to a first other carbon atom.

C. The transparent conductive article according to embodiment B, wherein the at least one pyridine-ketone compound further comprises a second carbonyl group comprising a second carbonyl carbon atom covalently bonded to the second alpha carbon atom, to a second oxygen atom, and to a second other carbon atom.

D. The transparent conductive article according to embodiment A, wherein the at least one pyridine-ketone compound comprises:

a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms;

a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and a first carbonyl group comprising a second carbonyl carbon atom covalently bonded to the first alpha carbon, to a first oxygen atom, and to the third alpha carbon atom.

E. The transparent conductive article according to embodiment D, wherein the pyridine-ketone compound further comprises a second carbonyl group comprising a second carbonyl carbon covalently bonded to the second alpha carbon atom, to a second oxygen atom, and to a first other carbon atom.

F. The transparent conductive article according to embodiment E, wherein the pyridine-ketone compound further comprises a third carbonyl group comprising a third carbonyl carbon atom covalently bonded to the fourth alpha carbon atom, to a third oxygen atom, and to a second other carbon atom.

G. The transparent conductive article of embodiment A, wherein the at least one pyridine-ketone compound comprises at least one of 2,6-diacetylpyridine or di(2-pyridyl) ketone.

H. The transparent conductive article of embodiment A, wherein the transparent support is a flexible transparent polymer film.

J. The transparent conductive article of embodiment A, wherein the silver nanowires are present in an amount sufficient to provide a surface resistivity of less than about 1000 ohm/sq.

K. The transparent conductive article of embodiment A, wherein the silver nanowires have an aspect ratio of from about 20 to about 3300.

L. The transparent conductive article of embodiment A, wherein the silver nanowires are present in an amount of from about 10 mg/m$^2$ to about 500 mg/m$^2$.

M. The transparent conductive article of embodiment A, having a transmittance of at least about 80% across entire spectrum range of from about 350 nm to about 1100 nm and a surface resistivity of 500 ohm/sq or less.

N. The transparent conductive article of embodiment A, wherein the at least one polymer binder comprises at least one water soluble polymer.

P. The transparent conductive article of embodiment N, wherein the at least one water soluble polymer comprises gelatin, polyvinyl alcohol, or mixtures thereof.

Q. The transparent conductive article of embodiment P, wherein the at least one polymer binder further comprises up to about 50 wt % of one or more additional water soluble polymers.

R. The transparent conductive article of embodiment Q, wherein one or more of the additional water soluble polymers is a polyacrylic polymer.

S. The transparent conductive article of embodiment 1, wherein the at least one polymer binder comprises an organic solvent soluble polymer.

T. The transparent conductive article of embodiment S, wherein the organic solvent soluble polymer binder comprises at least one cellulose ester polymer.

U. The transparent conductive article of embodiment S, wherein the organic solvent soluble polymer binder comprises cellulose acetate, cellulose acetate butyrate, or cellulose acetate propionate, or mixtures thereof.

V. The transparent conductive article of embodiment T, wherein the at least one cellulose ester polymer has a glass transition temperature of at least about 100° C.

W. The transparent conductive article of embodiment S, wherein the at least one polymer binder further comprises up to 50 wt % of one or more additional organic solvent soluble polymers.

X. The transparent conductive article of embodiment W, wherein the one or more of the additional organic solvent soluble polymers is a polyester polymer.

Y. A transparent conductive article comprising:
    a transparent support;
    at least one first layer disposed on the transparent support, the at least one first layer comprising a network of silver nanowires, a polymer binder, and at least one pyridine-ketone compound; and,
    at least one second layer comprising a transparent polymer.

Z. The transparent conductive article according to embodiment Y, wherein the at least one pyridine-ketone compound comprises:

a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and a first carbonyl group comprising a first carbonyl carbon atom covalently bonded to the first alpha carbon atom, to a first oxygen atom, and to a first other carbon atom.

AA. The transparent conductive article according to embodiment Z, wherein the at least one pyridine-ketone compound further comprises a second carbonyl group comprising a second carbonyl carbon atom covalently bonded to the second alpha carbon atom, to a second oxygen atom, and to a second other carbon atom.

AB. The transparent conductive article according to embodiment Y, wherein the at least one pyridine-ketone compound comprises:

a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms;

a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and a first carbonyl group comprising a second carbonyl carbon atom covalently bonded to the first alpha carbon, to a first oxygen atom, and to the third alpha carbon atom.

AC. The transparent conductive article according to embodiment AB, wherein the pyridine-ketone compound further comprises a second carbonyl group comprising a second carbonyl carbon covalently bonded to the second alpha carbon atom, to a second oxygen atom, and to a first other carbon atom.

AD. The transparent conductive article according to embodiment AC, wherein the pyridine-ketone compound further comprises a third carbonyl group comprising a third carbonyl carbon atom covalently bonded to the fourth alpha carbon atom, to a third oxygen atom, and to a second other carbon atom.

AE. The transparent conductive article of embodiment Y, wherein the at least one pyridine-ketone compound comprises at least one of 2,6-diacetylpyridine or di(2-pyridyl) ketone.

AF. The transparent conductive article of embodiment Y, wherein the transparent support is a flexible transparent polymer film.

AG. The transparent conductive article of embodiment Y, wherein the silver nanowires are present in an amount sufficient to provide a surface resistivity of less than about 1000 ohm/sq.

AH. The transparent conductive article of embodiment Y, wherein the silver nanowires have an aspect ratio of from about 21 to about 3300.

AJ. The transparent conductive article of embodiment Y, wherein the silver nanowires are present in an amount of from about 10 mg/m$^2$ to about 500 mg/m$^2$.

AK. The transparent conductive article of embodiment Y, having a transmittance of at least about 80% across entire spectrum range of from about 350 nm to about 1100 nm and a surface resistivity of 500 ohm/sq or less.

AL. The transparent conductive article of embodiment Y, wherein the at least one polymer binder comprises at least one water soluble polymer.

AM. The transparent conductive article of embodiment AL, wherein the at least one water soluble polymer comprises gelatin, polyvinyl alcohol, or mixtures thereof.

AN. The transparent conductive article of embodiment AM, wherein the at least one polymer binder further comprises up to about 50 wt % of one or more additional water soluble polymers.

AP. The transparent conductive article of embodiment AN, wherein one or more of the additional water soluble polymers is a polyacrylic polymer.

AQ. The transparent conductive article of embodiment Y, wherein the at least one polymer binder comprises an organic solvent soluble polymer.

AR. The transparent conductive article of embodiment AQ, wherein the organic solvent soluble polymer binder comprises at least one cellulose ester polymer.

AS. The transparent conductive article of embodiment AQ, wherein the organic solvent soluble polymer binder comprises cellulose acetate, cellulose acetate butyrate, or cellulose acetate propionate, or mixtures thereof.

AT. The transparent conductive article of embodiment AS, wherein the at least one cellulose ester polymer has a glass transition temperature of at least about 100° C.

AU. The transparent conductive article of embodiment AQ, wherein the at least one polymer binder further comprises up to about 50 wt % of one or more additional organic solvent soluble polymers.

AV. The transparent conductive article of embodiment AU, wherein the one or more of the additional organic solvent soluble polymers is a polyester polymer.

AW. A method comprising:

applying at least one first coating mixture onto a transparent support to form at least one first coated layer, the at least one first coating mixture comprising silver nanowires and at least one polymer binder; and, applying at least one second coating mixture onto the at least one first coated layer to form at least one second coated layer, the at least one second coating mixture comprising at least one pyridine-ketone compound.

AX. The method article according to embodiment AW, wherein the at least one pyridine-ketone compound comprises:

a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and a first carbonyl group comprising a first carbonyl carbon atom covalently bonded to the first alpha carbon atom, to a first oxygen atom, and to a first other carbon atom.

AY. The method according to embodiment AX, wherein the at least one pyridine-ketone compound further comprises a second carbonyl group comprising a second carbonyl carbon atom covalently bonded to the second alpha carbon atom, to a second oxygen atom, and to a second other carbon atom.

AZ. The method according to embodiment AW, wherein the at least one pyridine-ketone compound comprises:

a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms;

a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and a first carbonyl group comprising a second carbonyl carbon atom covalently bonded to the first alpha carbon, to a first oxygen atom, and to the third alpha carbon atom.

BA. The method according to embodiment AZ, wherein the pyridine-ketone compound further comprises a second carbonyl group comprising a second carbonyl carbon covalently bonded to the second alpha carbon atom, to a second oxygen atom, and to a first other carbon atom.

BB. The method according to embodiment BA, wherein the pyridine-ketone compound further comprises a third carbonyl group comprising a third carbonyl carbon atom covalently bonded to the fourth alpha carbon atom, to a third oxygen atom, and to a second other carbon atom.

BC. The method according to embodiment AW, wherein the at least one pyridine-ketone compound comprises at least one of 2,6-diacetylpyridine or di(2-pyridyl)ketone.

BD. The method according to embodiment AW, wherein the applying the at least one first coating mixture and the applying the at least one second coating mixture occur simultaneously.

BE. The method according to embodiment AW, further comprising drying the at least one first layer or the at least one second layer or both.

BF. A method comprising:
applying at least one first coating mixture onto a transparent support to form at least one first coated layer, the at least one first coating mixture comprising at least one pyridine-ketone compound and a mixture comprising silver nanowires and at least one polymer binder; and,
applying at least one second coating mixture onto the at least one first coated layer.

BG. The method article according to embodiment BF, wherein the at least one pyridine-ketone compound comprises:
a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and
a first carbonyl group comprising a first carbonyl carbon atom covalently bonded to the first alpha carbon atom, to a first oxygen atom, and to a first other carbon atom.

BH. The method according to embodiment BG, wherein the at least one pyridine-ketone compound further comprises a second carbonyl group comprising a second carbonyl carbon atom covalently bonded to the second alpha carbon atom, to a second oxygen atom, and to a second other carbon atom.

BJ. The method according to embodiment BF, wherein the at least one pyridine-ketone compound comprises:
a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms;
a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and
a first carbonyl group comprising a second carbonyl carbon atom covalently bonded to the first alpha carbon, to a first oxygen atom, and to the third alpha carbon atom.

BK. The method according to embodiment BJ, wherein the pyridine-ketone compound further comprises a second carbonyl group comprising a second carbonyl carbon atom covalently bonded to the second alpha carbon atom, to a second oxygen atom, and to a first other carbon atom.

BL. The method according to embodiment BK, wherein the pyridine-ketone compound further comprises a third carbonyl group comprising a third carbonyl carbon atom covalently bonded to the fourth alpha carbon atom, to a third oxygen atom, and to a second other carbon atom.

BM. The method according to embodiment BL, wherein the at least one pyridine-ketone compound comprises at least one of 2,6-diacetylpyridine or di(2-pyridyl)ketone.

BN. The method according to embodiment BF, wherein the applying the at least one first coating mixture and the applying the at least one second coating mixture occur simultaneously.

BP. The method according to embodiment BF, further comprising drying the at least one first layer or the at least one second layer or both.

EXAMPLES

Materials

All materials used in the following examples are readily available from standard commercial sources, such as Sigma-Aldrich Chemical Co. LLC (Saint Louis) unless otherwise specified. All percentages are by weight unless otherwise indicated.

2,6-diacetyl pyridine (DAP), available from Sigma-Aldrich, has the structure:

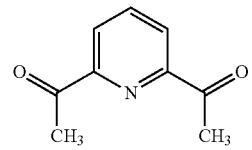

Di(2-pyridal)ketone (DPK), available from Sigma-Aldrich, has the structure:

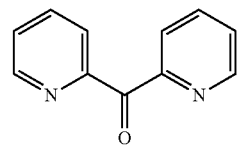 [SMILES: O=C(c1ccccn1)c1ccccn1]

CAB 171-15 is a cellulose acetate butyrate resin available from Eastman Chemical Co. (Kingsport, Tenn.). It has a glass transition temperature of 161° C.

CAB 381-20 is a cellulose acetate butyrate resin available from Eastman Chemical Co. (Kingsport, Tenn.). It has a glass transition temperature of 141° C.

CAB 553-0.4 is a cellulose acetate butyrate resin available from Eastman Chemical Co. (Kingsport, Tenn.). It has a glass transition temperature of 136° C.

CYMEL® 303 crosslinker is hexamethoxymethylmelamine, available from Cytec Industries (West Paterson, N.J.).

DAROCUR® 1173 photoinitiator is 2-hydroxy-2-methyl-1-phenyl-propan-1-one, having a molecular weight of 164.2 g/mo, available from BASF (Florham Park, N.J.).

ESTAR® polyester substrate is available from Eastman Kodak (Rochester, N.Y.).

SLIP-AYD® FS 444 (polysiloxane in dipropylene glycol, Elementis) is a liquid additive for increasing surface slip and mar resistance of water borne and polar solvent borne coatings.

SR399 (dipentaerythritolpentaacrylate, Sartomer) is a clear liquid, having a molecular weight of 525 g/mol, and the following structure:

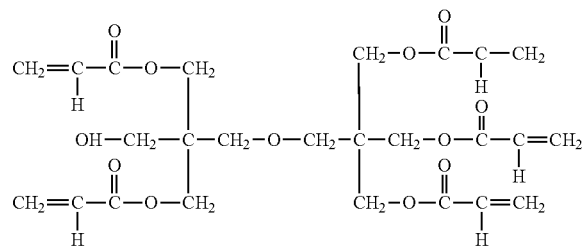 [SMILES: C=CC(=O)OCC(CO)(COCC(COC(=O)C=C)(COC(=O)C=C)COC(=O)CC)COC(=O)C=C]

Mayer Bars are ½ inch diameter Type 303 stainless steel coating rods and are available from R.D. Specialties, Inc. (Webster, N.Y.).

Silver nanowires were prepared according to two procedures. For Example 1, 3, and 4, a procedure similar to Example 13 of US patent application publication 2012/0328469A1, published Dec. 27, 2012, was followed, using a reaction temperature of 160° C. for 45 minutes. Silver nanowires so prepared exhibited an average diameter of 54±29 nm, and an average length of 18±14 μm. For Example 2, silver nanowires were prepared according to procedures described in U.S. patent application Ser. No. 14/043,966, filed Oct. 2, 2013, which is hereby incorporated by reference in its entirety. The typical silver nanowires had diameters ranging from 38 nm to 44 nm and range in length from 17 to 25 μm.

XCURE® 184 photoinitiator is 1-hydroxy-cyclohexylphenyl-ketone (Dalian).

Example 1

Preparation of Silver Nanowire Coating Dispersion

A CAB polymer premix solution was prepared by mixing 15 parts by weight of CAB 381-20 (cellulose acetate butyrate polymer, Eastman Chemical) with 85 parts by weight of n-propyl acetate (Oxea). The resulting CAB polymer premix solution was filtered prior to use.

17.32 parts by weight of the CAB polymer premix solution was combined with 18.18 parts by weight ethyl lactate (>99.8% purity), 56.16 parts by weight of a 1.85% solids dispersion of silver nanowires in isopropanol, and 8.34 parts by weight of n-propyl acetate (Oxea) to form a silver nanowire coating dispersion at 3.64% solids.

Finished silver solutions were prepared by adding various loadings of di(2-pyridyl)ketone (DPK) to aliquots of the masterbatch solution, as shown in Table I. The finished silver nanowire coating dispersions were coated on a lab proofer with a 380 lines per inch (LPI) plate onto 5 mil ESTAR LS polyester support, and dried at 280° F. for 2 minutes.

Preparation of Topcoat Solution

A CAB polymer premix solution was prepared by mixing 15 parts by weight of CAB 553-0.4 (cellulose acetate butyrate polymer, Eastman Chemical) into 42.50 parts by weight of denatured ethanol and 42.50 parts by weight methanol (>99% purity). The resulting CAB polymer premix solution was filtered prior to use.

A topcoat masterbatch solution was prepared by adding to 5000 parts by weight of the CAB polymer premix solution, 1405 parts by weight denatured ethanol, 2250 parts by weight of 33 wt % SR399 (dipentaerythritol pentaacrylate, Sartomer) in denatured ethanol, 150 parts by weight of 10 wt % SLIP-AYD FS-444 (polysiloxane in dipropylene glycol ether, Elementis) in denatured ethanol, 435 parts by weight of 31 wt % DAROCUR 1173 (Ciba) in denatured ethanol and 1027 parts by weight of n-butanol (>98% purity). The topcoat masterbatch solution had 16.0% solids.

Preparation of the Coated Films

The above topcoat solution was overcoated on the silver nanowire thin conducting films (AgTCF) with a 450 lines per inch (LPI) plate. The coatings were then dried in an oven at 220° F. for 2 minutes followed by two pass ultra-violet (UV) curing with a Fusion 300 UV-H lamp at 20 ft/minutes.

Evaluation of the Coated Films

TCF surface resistivity was evaluated at 80° C. and on a lab desktop at periods of elapsed time lasting up to 3 months. Light transmission and haze were evaluated as well. Evaluation of the surface resistivity, light transmission, and haze are outlined below.

80° C. TCF Stability Test

Surface resistivity was measured for the coatings immediately after coating (initial values) with either a RCHEK RC3175 4-point resistivity meter or a Delcom 707 non-contact conductance monitor. These TCF samples were then placed in a Blue-M oven with free air flow at 80° C. for 10 days. After the test period, the TCF samples were then checked again to record the change in film resistivity.

Desktop TCF Stability Test

Surface resistivity was measured for the coatings immediately after coating (initial values) with either a RCHEK RC3175 4-point resistivity meter or a Delcom 707 non-contact conductance monitor. These TCF samples were then placed on lab desktop under 1500-2000 LUX fluorescence light with the TCF side towards the light for 1 and 2 months. After the test period, the TCF samples were then checked again to record the change in film resistivity.

The stability testing results in Table I show both 80° C. stability and desktop stability were improved upon addition of di(2-pyridyl)ketone (DPK) directly to the silver nanowire coating dispersion.

TABLE I

| Sample # | DPK in Ag Solution (wt %) | Ratio of Wires to DPK (g/g) | Surface Resistivity t = 0 (ohms/sq) | Total light trans. (% T) | Haze (%) | Surface Resistivity Change 80° C. t = 10 days (% change) | Surface Resistivity Change Desktop t = 1 month (% change) | Surface Resistivity Change Desktop t = 2 month (% change) |
|---|---|---|---|---|---|---|---|---|
| Com-1-1 | none | | 94 | 88.9 | 2.11 | +165 | +13 | +24 |
| 1-1 | 0.01 | 106 | 85 | 88.7 | 2.24 | +65 | −2 | +7 |
| 1-2 | 0.05 | 21 | 88 | 88.9 | 2.16 | +90 | +15 | +32 |

Example 2

Preparation of Silver Nanowire Coating Dispersion

A CAB polymer premix solution was prepared by mixing 15 parts by weight of CAB 381-20 (cellulose acetate butyrate polymer, Eastman Chemical) with 85 parts by weight of n-propyl acetate (Oxea). The resulting CAB polymer premix solution was filtered prior to use.

15.00 parts by weight of the CAB polymer premix solution was combined with 10.00 parts by weight ethyl lactate (>99.8% purity), 40.55 parts by weight of a 1.85% solids dispersion of silver nanowires in isopropanol, and 34.44 parts by weight of n-propyl acetate (Oxea) to form a silver nanowire coating dispersion at 3.00% solids.

The finished silver nanowire coating dispersion was coated on a lab proofer with a 380 LPI plate onto 5 mil ESTAR LS polyester support, and dried at 275° F. for 2 minutes.

Preparation of Topcoat Solution

A CAB polymer premix solution was prepared by mixing 15 parts by weight of CAB 553-0.4 (cellulose acetate butyrate polymer, Eastman Chemical) into 42.50 parts by weight of denatured ethanol and 42.50 parts by weight methanol (>99% purity). The resulting CAB polymer premix solution was filtered prior to use.

A topcoat masterbatch solution was prepared by adding to 5000 parts by weight of the CAB polymer premix solution, 3585 parts by weight denatured ethanol, 10188 parts by weight of 33 wt % SR399 (dipentaerythritol pentaacrylate, Sartomer) in denatured ethanol, 660 parts by weight of 10 wt % SLIP-AYD FS-444 (polysiloxane in dipropylene glycol ether, Elementis) in denatured ethanol, 3774 parts by weight of 10 wt % XCURE 184 (Dalian) in denatured ethanol. The topcoat masterbatch solution had 19.5% solids.

Finished topcoat solutions were prepared by adding various loadings of di(2-pyridyl)ketone (DPK) to aliquots of the masterbatch solution as shown in Table II.

Preparation of the Coated Films

The finished topcoat solutions were then coated onto the AgTCF layer using a lab proofer with a 450 LPI plate, and dried in an oven at 115° F. for 2 minutes followed by two pass UV curing with a Fusion 300 UV-H lamp at 30 feet/minute speed.

Evaluation of the Coated Films

Films were evaluated using the methods described in Example 1. The stability testing results in Table II show desktop stability was improved upon addition of di(2-pyridyl) ketone (DPK) to the topcoat solution.

isopropyl acetate (>98.6% purity, Aldrich). The resulting CAB polymer premix solution was filtered prior to use.

25.43 parts by weight of the CAB polymer premix solution was combined with 16.96 parts by weight ethyl lactate (>99.8% purity), 45.82 parts by weight of a 1.85% solids dispersion of silver nanowires in isopropanol, and 11.79 parts by weight of isopropyl acetate (>98.6% purity, Aldrich) to form a silver nanowire coating dispersion at 3.39% solids.

The finished silver nanowire coating dispersions were coated on a lab proofer with a 320 LPI plate onto 5 mil ESTAR LS polyester support, and dried at 280° F. for 2 minutes.

Preparation of Topcoat Solution

A CAB polymer premix solution was prepared by mixing 15 parts by weight of CAB 553-0.4 (cellulose acetate butyrate polymer, Eastman Chemical) into 42.50 parts by weight of denatured ethanol and 42.50 parts by weight methanol (>99% purity). The resulting CAB polymer premix solution was filtered prior to use.

A topcoat masterbatch solution was prepared by adding to 5000 parts by weight of the CAB polymer premix solution, 4040 parts by weight denatured ethanol, 2250 parts by weight of 33 wt % CYMEL 303 (hexamethoxymethylmelamine, Cytec) in denatured ethanol, 150 parts by weight of 10 wt % SLIP-AYD FS-444 (polysiloxane in dipropylene glycol ether, Elementis) in denatured ethanol, 375 parts by weight of 20 wt % p-toluenesulfonic acid (PTSA, Fisher/Univar) in denatured ethanol and 4018 parts by weight of isopropanol (>98% purity). The topcoat masterbatch solution had 10.0% solids.

Finished topcoat solutions were prepared by adding various loadings of 2,6-diacetylpyridine (DAP) to aliquots of the masterbatch solution as shown in Table III.

Preparation of the Coated Films

The finished topcoat solutions were then coated onto the AgTCF layer using a lab proofer with a 450 LPI plate, and dried at 280° F. for 3 minutes.

Evaluation of the Coated Films

The thin conducting films were evaluated using the methods described in Example 1. The stability testing results in Table III show that desktop stability was improved upon addition of 2,6-diacetylpyridine (DAP) to the topcoat solution.

The invention has been described in detail with particular reference to a presently preferred embodiment, but it will be understood that variations and modifications can be effected

TABLE II

| Sample # | DPK in Topcoat Solution DPK (wt %) | Surface Resistivity t = 0 (ohms/sq) | Total light trans. (% T) | Haze (%) | Surface Resistivity Change 80° C. t = 10 days (% change) | Surface Resistivity Change Desktop t = 1 month (% change) | Surface Resistivity Change Desktop t = 2 months (% change) |
|---|---|---|---|---|---|---|---|
| Com-2-1 | none | 78 | 91.0 | 1.48 | −1% | +44% | +80% |
| 2-1 | 0.222 | 72 | 91.2 | 1.41 | +13% | +28% | +39% |
| 2-2 | 0.452 | 70 | 91.0 | 1.47 | +19% | +4% | +10% |

Example 3

Preparation of Silver Nanowire Coating Dispersion

A CAB polymer premix solution was prepared by mixing 10 parts by weight of CAB 381-20 (cellulose acetate butyrate polymer, Eastman Chemical) with 90 parts by weight of within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

TABLE III

| Sample # | DAP in Topcoat Solution (wt % DAP) | Surface Resistivity t = 0 (ohms/sq) | Total light trans. (% T) | Haze (%) | Surface Resistivity Change 80° C. t = 10 days (% change) | Surface Resistivity Change Desktop t = 1 month (% change) | Surface Resistivity Change Desktop t = 2 months (% change) | Surface Resistivity Change Desktop t = 4 months (% change) |
|---|---|---|---|---|---|---|---|---|
| Com-1-1 | none | 71 | 90.1 | 2.2 | +111 | +25 | +34 | +55 |
| 1-1 | 1.00 | 73 | 90.0 | 2.2 | +105 | +15 | +14 | +32 |
| 1-2 | 5.00 | 75 | 90.1 | 2.2 | +80 | +17 | +16 | +35 |

What is claimed:

1. A transparent conductive article comprising:
a transparent support;
at least one first layer disposed on the transparent support, the at least one first layer comprising a network of silver nanowires dispersed within at least one polymer binder, and;
at least one second layer disposed adjacent to at least one first layer, the at least one second layer comprising at least one pyridine-ketone compound.

2. The transparent conductive article according to claim 1, wherein the at least one second layer is disposed on the at least one first layer.

3. The transparent conductive article according to claim 1, where in the at least one second layer is disposed between the transparent support and the at least one first layer.

4. The transparent conductive article according to claim 1, wherein the at least one pyridine-ketone compound comprises:
a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms; and
a first carbonyl group comprising a first carbonyl carbon atom covalently bonded to the first alpha carbon atom, to a first oxygen atom, and to a first other carbon atom.

5. The transparent conductive article according to claim 4, wherein the at least one pyridine-ketone compound further comprises a second carbonyl group comprising a second carbonyl carbon atom covalently bonded to the second alpha carbon atom, to a second oxygen atom, and to a second other carbon atom.

6. The transparent conductive article according to claim 1, wherein the at least one pyridine-ketone compound comprises:
a first unsaturated ring consisting of a first nitrogen atom, a first alpha carbon atom covalently bonded to the first nitrogen atom, a second alpha carbon atom covalently bonded to the first nitrogen atom, a first beta carbon atom covalently bonded to the first alpha carbon atom, a second beta carbon atom covalently bonded to the second alpha carbon atom, and a first gamma carbon atom covalently bonded to the first and second beta carbon atoms;
a second unsaturated ring consisting of a second nitrogen atom, a third alpha carbon atom covalently bonded to the second nitrogen atom, a fourth alpha carbon atom covalently bonded to the second nitrogen atom, a third beta carbon atom covalently bonded to the third alpha carbon atom, a fourth beta carbon atom covalently bonded to the fourth alpha carbon atom, and a second gamma carbon atom covalently bonded to the third and fourth beta carbon atoms; and
a first carbonyl group comprising a second carbonyl carbon atom covalently bonded to the first alpha carbon, to a first oxygen atom, and to the third alpha carbon atom.

7. The transparent conductive article according to claim 6, wherein the pyridine-ketone compound further comprises a second carbonyl group comprising a second carbonyl carbon covalently bonded to the second alpha carbon atom, to a second oxygen atom, and to a first other carbon atom.

8. The transparent conductive article according to claim 7, wherein the pyridine-ketone compound further comprises a third carbonyl group comprising a third carbonyl carbon atom covalently bonded to the fourth alpha carbon atom, to a third oxygen atom, and to a second other carbon atom.

9. The transparent conductive article of claim 1, wherein the at least one pyridine-ketone compound comprises at least one of 2,6-diacetylpyridine or di(2-pyridyl)ketone.

10. The transparent conductive article of claim 1, having a transmittance of at least about 80% across entire spectrum range of from about 350 nm to about 1100 nm and a surface resistivity of 500 ohm/sq or less.

11. The transparent conductive article of claim 1, wherein the at least one polymer binder comprises at least one water soluble polymer.

12. The transparent conductive article of claim 11, wherein the at least one water soluble polymer comprises gelatin, polyvinyl alcohol, or mixtures thereof.

13. The transparent conductive article of claim 1, wherein the at least one polymer binder comprises an organic solvent soluble polymer.

14. The transparent conductive article of claim 13, wherein the organic solvent soluble polymer binder comprises at least one cellulose ester polymer.

15. The transparent conductive article of claim 13, wherein the organic solvent soluble polymer binder comprises cellulose acetate, cellulose acetate butyrate, or cellulose acetate propionate, or mixtures thereof.

16. A transparent conductive article comprising:
a transparent support;
at least one first layer disposed on the transparent support, the at least one first layer comprising at least one pyridine-ketone compound and a network of silver nanowires and dispersed within at least one polymer binder.

17. A method comprising:
applying at least one first coating mixture onto a transparent support to form at least one first coated layer, the at least one first coating mixture comprising silver nanowires and at least one polymer binder; and, applying at least one second coating mixture onto the at least one first coated layer to form at least one second coated layer, the at least one second coating mixture comprising at least one pyridine-ketone compound.

* * * * *